United States Patent
Yokoi et al.

(10) Patent No.: US 8,102,830 B2
(45) Date of Patent: Jan. 24, 2012

(54) MIMO RADIO COMMUNICATION APPARATUS AND METHOD

(75) Inventors: Atsuya Yokoi, Yokohama-si (JP); Tsutomu Mitsui, Yokohama-si (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1436 days.

(21) Appl. No.: 11/640,583

(22) Filed: Dec. 18, 2006

(65) Prior Publication Data

US 2007/0142004 A1  Jun. 21, 2007

(30) Foreign Application Priority Data

Dec. 16, 2005 (JP) .................................. 2005-362737
Sep. 5, 2006 (KR) ......................... 10-2006-0085369

(51) Int. Cl.
*H04H 20/67* (2008.01)

(52) U.S. Cl. .................... 370/339; 455/562.1; 455/12.1; 455/101; 455/102; 455/103; 370/343; 370/334; 370/335; 370/441; 370/342; 375/229; 375/230; 375/231; 375/232

(58) Field of Classification Search ............... 455/562.1, 455/12.1, 101–103; 370/150, 334–335, 342–344, 370/441; 375/229–232
See application file for complete search history.

(56) References Cited

U.S. PATENT DOCUMENTS

| | | | | |
|---|---|---|---|---|
| 5,936,577 A | * | 8/1999 | Shoki et al. | 342/373 |
| 5,966,094 A | * | 10/1999 | Ward et al. | 342/373 |
| 6,236,866 B1 | * | 5/2001 | Meyer et al. | 455/562.1 |
| 6,442,148 B1 | * | 8/2002 | Adams et al. | 370/325 |
| 6,782,257 B1 | * | 8/2004 | Moustakas et al. | 455/423 |
| 6,784,838 B2 | * | 8/2004 | Howell | 342/377 |
| 6,920,192 B1 | * | 7/2005 | Laroia et al. | 375/347 |
| 7,020,490 B2 | * | 3/2006 | Khatri | 455/561 |
| 7,110,793 B1 | * | 9/2006 | Ishida | 455/562.1 |
| 7,151,809 B2 | * | 12/2006 | Ketchum et al. | 375/347 |
| 7,154,960 B2 | * | 12/2006 | Liu et al. | 375/267 |
| 7,206,607 B2 | * | 4/2007 | Kim et al. | 455/562.1 |
| 7,263,083 B2 | * | 8/2007 | Kisigami et al. | 370/335 |
| 7,408,976 B1 | * | 8/2008 | Narasimhan et al. | 375/148 |
| 7,885,228 B2 | * | 2/2011 | Walton et al. | 370/329 |
| 2001/0004604 A1 | * | 6/2001 | Toshimitsu et al. | 455/562 |
| 2001/0005685 A1 | * | 6/2001 | Nishimori et al. | 455/562 |
| 2002/0045432 A1 | * | 4/2002 | Yoshida | 455/276.1 |
| 2002/0127978 A1 | * | 9/2002 | Khatri | 455/103 |
| 2002/0187814 A1 | * | 12/2002 | Yoshida | 455/562 |
| 2003/0152099 A1 | * | 8/2003 | Chun et al. | 370/441 |

(Continued)

FOREIGN PATENT DOCUMENTS

JP  2005-045351  2/2005

*Primary Examiner* — Rafael Pérez-Gutiérrez
*Assistant Examiner* — Lameka J. Kirk
(74) *Attorney, Agent, or Firm* — NSIP Law

(57) ABSTRACT

A multi-input multi-output (MIMO) radio communication apparatus and method are provided. The MIMO apparatus includes a plurality of reception antennas each having a plurality of antenna patterns; a channel matrix estimation unit for estimating a channel matrix between a plurality of transmission antennas and the plurality of reception antennas; a channel capacity calculation unit for calculating a channel capacity corresponding to a combination of antenna patterns of the plurality of reception antennas by using the estimated channel matrix; and an antenna pattern control unit for changing the antenna patterns of the plurality of reception antennas to maximize the channel capacity. According to the MIMO radio communication apparatus and method, direction can be controlled adaptively to a propagation environment.

16 Claims, 7 Drawing Sheets

U.S. PATENT DOCUMENTS

| | | | |
|---|---|---|---|
| 2003/0162519 A1* | 8/2003 | Smith et al. | 455/277.1 |
| 2003/0181170 A1* | 9/2003 | Sim | 455/101 |
| 2004/0023657 A1* | 2/2004 | Lim | 455/446 |
| 2004/0029533 A1* | 2/2004 | Matsuo et al. | 455/63.1 |
| 2005/0078665 A1* | 4/2005 | Yu et al. | 370/380 |
| 2005/0157807 A1* | 7/2005 | Shim et al. | 375/267 |
| 2005/0254556 A1* | 11/2005 | Fujii et al. | 375/144 |
| 2006/0030346 A1* | 2/2006 | Hayashi et al. | 455/515 |
| 2006/0105709 A1* | 5/2006 | Oh et al. | 455/13.1 |
| 2006/0202892 A1* | 9/2006 | Feng et al. | 342/374 |
| 2008/0008130 A1* | 1/2008 | Haga et al. | 370/331 |
| 2008/0247370 A1* | 10/2008 | Gu et al. | 370/338 |

* cited by examiner

OMNI PATTERN

PATTERN COMBINATION P21

PATTERN COMBINATION P31

MIMO RADIO COMMUNICATION APPARATUS AND METHOD

PRIORITY

This application claims the benefits of Japanese Patent Application No. 2005-362737, filed on Dec. 16, 2005, in Japanese Intellectual Property Office, and Korea Patent Application No. 10-2006-0085369, filed on Sep. 5, 2006, in the Korean Intellectual Property Office, the contents of each of which are incorporated herein in their entirety by reference.

BACKGROUND OF THE INVENTION

1. Field of the Invention

The present invention relates to a radio communication apparatus and method, and more particularly, to a multi-input multi-output (MIMO) radio communication apparatus and method.

2. Description of the Related Art

One method of increasing a communication capacity without increasing a frequency band, is through the use of multi-input multi-output (MIMO) technology in which a plurality of transmitter antennas are installed. In a space division multiplexing (SDM) method, which is one of the MIMO methods, a data stream to be transmitted is divided into a plurality of sub streams and the sub streams are independently transmitted from respective antennas. After the signals transmitted in parallel through these multi paths are received by a plurality of antennas, the signal is restored to the original data stream. In this way, for example, the quantity of data that can be transmitted in a channel in a wireless local area network (WLAN) can be increased.

In general, in an MIMO method model, the relations among a transmission vector signal (x), a received vector signal (y), and a channel matrix (H) can be expressed as y=Hx. In this case, a channel capacity can be obtained from a transmission power, a channel matrix (H), and the number of transmission antennas.

A technology related to the directional control of each antenna in a radio communication method using an MIMO technology is disclosed in Japanese Patent Application Laid-Open No. 2005-45351 (hereinafter referred to as Patent Document 1) titled "A MIMO-Type Radio Communication System and Radio Communication Apparatus".

According to the technology, eigenvalues of a channel matrix (H) are calculated, and an estimated value of a channel matrix (H) with respect to eigenvalues which each have a value greater than the average value of the eigenvalues is calculated back. An antenna pattern implementing this estimated value of the channel matrix (H), i.e., an adaptive antenna array, is obtained, thus obtaining desired antenna direction.

However, this technology requires a large amount of computation until an antenna pattern is determined. Also, since the direction of an antenna is controlled so that a current channel matrix can approach to the calculated-back channel matrix, the antenna pattern should be continuous and variable.

SUMMARY OF THE INVENTION

The present invention provides a multi-input multi-output (MIMO) radio communication apparatus and method using a plurality of transmission and reception antennas in which the amount of computation in a process for selecting an antenna pattern is reduced, and direction is controlled adaptively to a propagation environment.

According to an aspect of the present invention, there is provided a radio communication apparatus including a plurality of reception antennas each having a plurality of antenna patterns; a channel matrix estimation unit for estimating a channel matrix between a plurality of transmission antennas and the plurality of reception antennas; a channel capacity calculation unit for calculating a channel capacity corresponding to a combination of antenna patterns of the plurality of reception antennas by using the estimated channel matrix; and an antenna pattern control unit for changing the antenna patterns of the plurality of reception antennas so that the channel capacity can be maximized.

According to another aspect of the present invention, there is provided radio communication method including estimating a channel matrix between a plurality of transmission antennas and a plurality of reception antennas each having a plurality of antenna patterns; calculating a channel capacity corresponding to a combination of antenna patterns of the plurality of reception antennas by using the estimated channel matrix; and changing the antenna patterns of the plurality of reception antennas so that the channel capacity can be maximized.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

The present invention will now be described more fully with reference to the accompanying drawings, in which preferred embodiments of the invention are shown.

Figure 1:
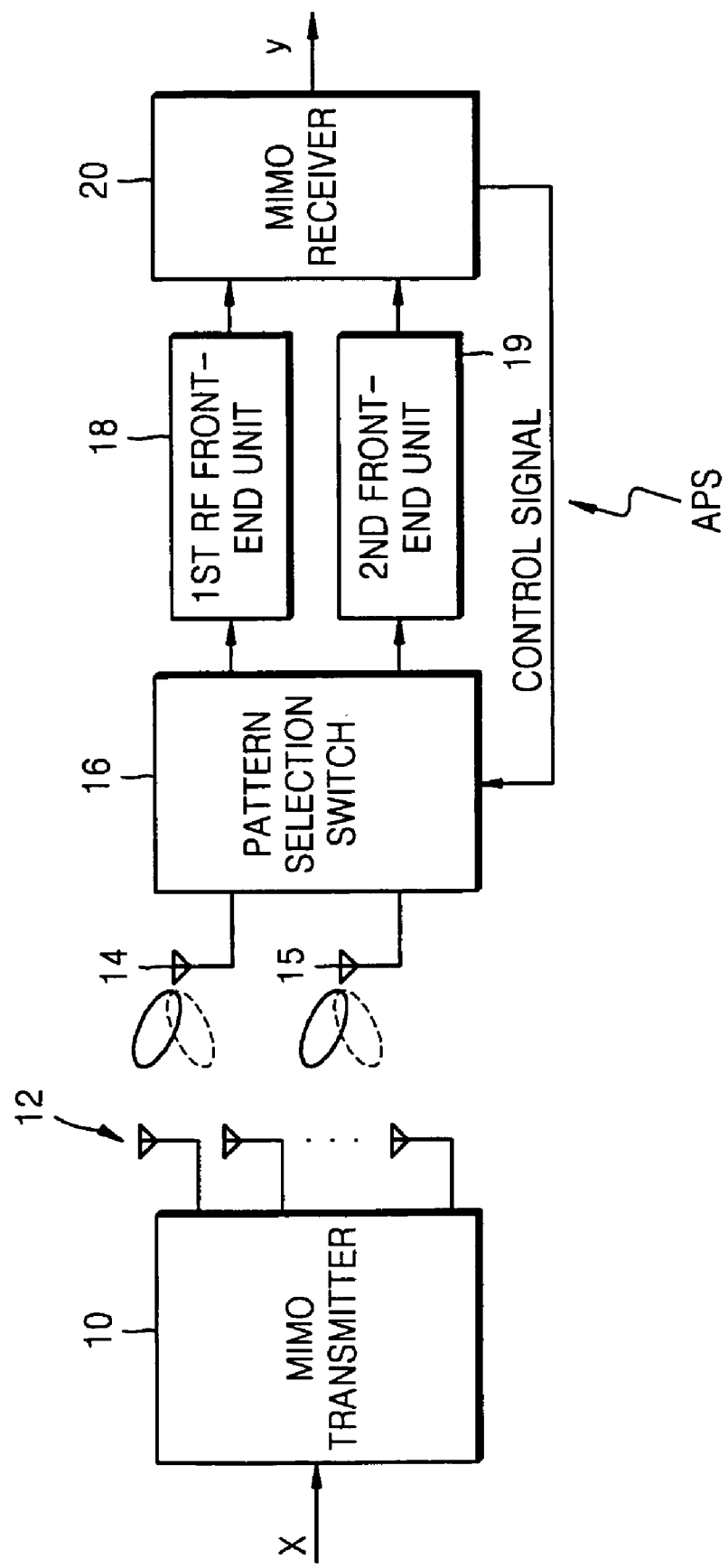
FIG. 1 is a block diagram illustrating a structure of a radio communication apparatus according to the present invention.

FIG. 1 is a block diagram illustrating a structure of a radio communication apparatus according to the present invention.

Referring to FIG. 1, a transmission vector signal (x) is divided in a MIMO transmitter 10 and transmitted to each transmission unit (not shown). The output of each transmission unit is radiated from a plurality of transmission antennas 12.

The signal radiated from the plurality of transmission antennas 12 is propagated through a transmission path, i.e., a space that can be regarded as parallel multi paths, and arrives at a first reception antenna 14 and a second reception antenna 15. Though the number of reception antennas is being illustrated as 2 for convenience of explanation, the number of reception antennas may be more than 2 and is still within the scope of the present invention.

The first and second reception antennas 14 and 15 each have a plurality of antenna patterns, for example, 2 antenna patterns. In the patterns, a combination maximizing the channel capacity is determined. A method of determining the combination will be explained later in more detail. The antenna pattern of the first and second reception antennas 14 and 15 is changed by a pattern selection switch 16. This switching unit will also be referred to as an antenna pattern selection (APS).

A received signal from the first reception antenna 14 which is changed to the selected antenna pattern is input to an MIMO receiver 20 through a first RF front end unit 18. Likewise, a received signal from the second reception antenna 15 is input to the MIMO receiver 20 through a second RF front end unit 19. A received vector signal (y) is obtained from two sets of received signals in the MIMO receiver 20. The MIMO receiver 20 also outputs a control signal to control the antenna pattern selection in the pattern selection switch 16.

Figure 2:
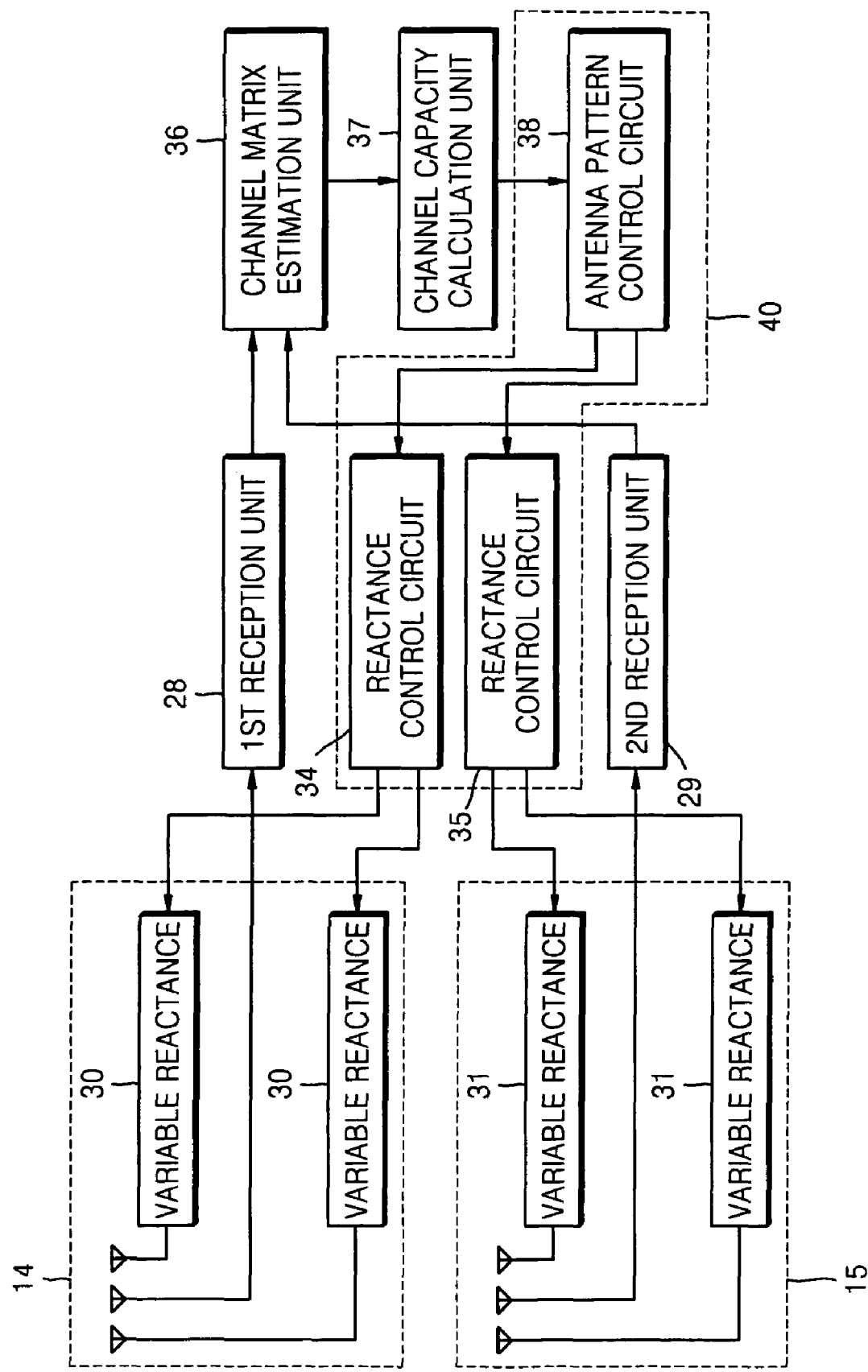
FIG. 2 is a block diagram illustrating a reception side in a radio communication apparatus according to the present invention.

FIG. 2 is a block diagram illustrating a reception side in a radio communication apparatus according to the present invention.

The block diagram illustrated in FIG. 2 will be used to explaining a method of obtaining an optimum reception antenna pattern using a transmission training signal. First, a received signal of a first reception antenna 14 is input to a channel matrix estimation unit 36 through a first reception unit 28. The first reception antenna 14 includes two conductors connected to variable reactances 30. The direction of the first reception antenna 14 can be controlled by the variable reactances 30. Likewise, the direction of a second reception antenna 15 is also controlled in the same manner, and a received signal is input to the channel matrix estimation unit 36 through a second reception unit 29.

The channel matrix estimation unit 36 estimates a channel matrix between a plurality of transmission antennas 12 and a plurality of reception antennas 14 and 15.

By using the estimated channel matrix, a channel capacity calculation unit 37 calculates a channel capacity corresponding to a combination of antenna patterns of the plurality of reception antennas 14 and 15.

An antenna pattern control unit 40 includes an antenna pattern control circuit 38 and reactance control circuits 34 and 35. Based on the channel capacity calculated in the channel capacity calculation unit 37, the antenna pattern control circuit 38 outputs a control signal to change an antenna pattern so that the channel capacity can be maximized. The reactance control circuits 34 and 35 in response to the control signal output from the antenna pattern control circuit 38 outputs control signals to change the variable reactances 30 and 31.

Figure 3:
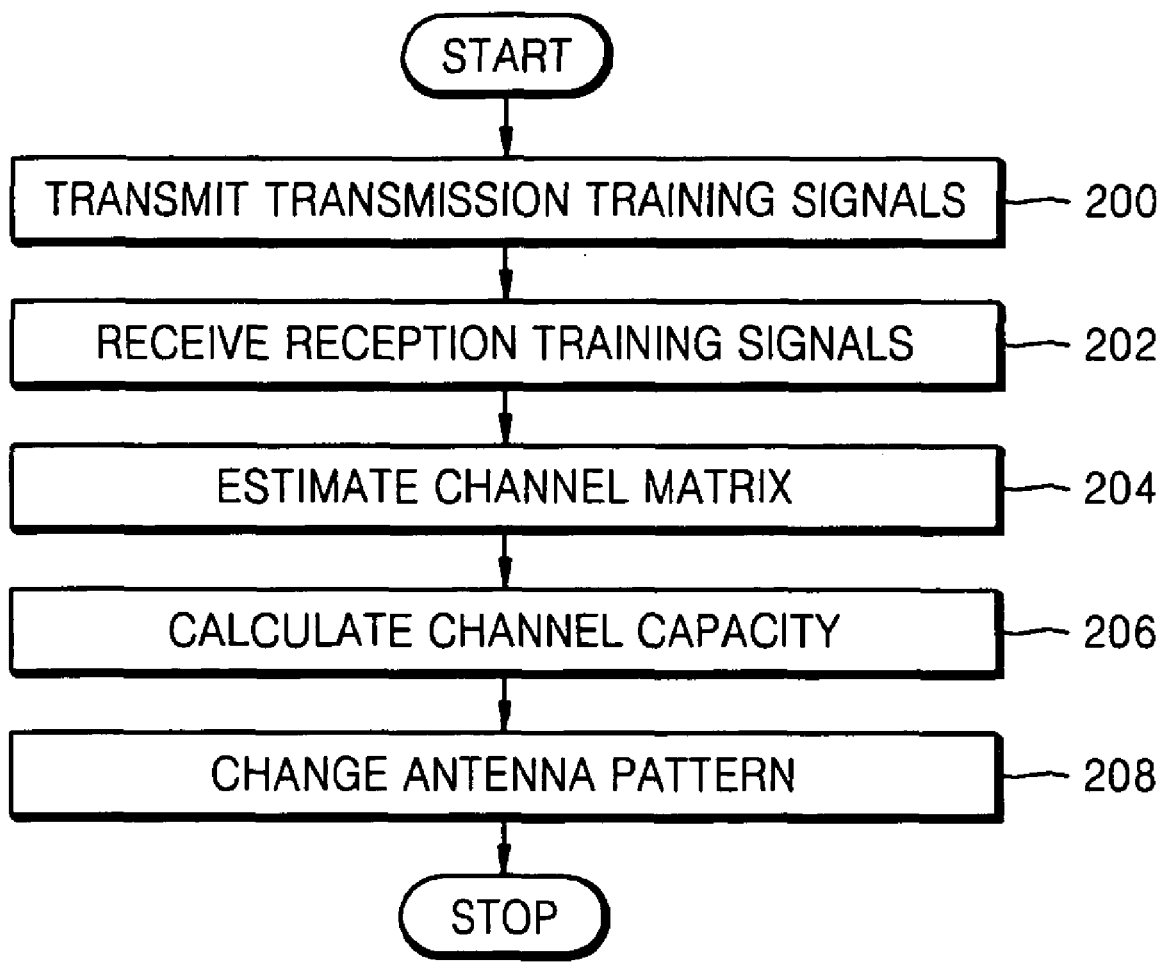
FIG. 3 is a flowchart of a radio communication method according to the present invention.

FIG. 3 is a flowchart of a radio communication method according to the present invention.

First, a plurality of transmission antennas transmit in parallel transmission training signals that are independent to each other, in step 200.

A plurality of reception antennas which each have a plurality of antenna patterns receive reception training signals in parallel in step 202.

By using transmission training signals and reception training signals, a channel matrix between the plurality of transmission antennas and the plurality of reception antennas is estimated in step 204.

By using the estimated channel matrix, a channel capacity corresponding to a combination of the antenna patterns of the plurality of antennas is calculated in step 206.

By changing all the combinations of the antenna patterns of the plurality of antennas, channel capacities are compared, and the antenna pattern is changed so that the combination of the antenna patterns can maximize the channel capacity in step 208. In this way, according to a channel matrix maximizing the channel capacity, communication begins.

Each operation will now be explained in more detail. First, the estimating of the channel matrix in step 204 will be explained in detail.

Figure 4:
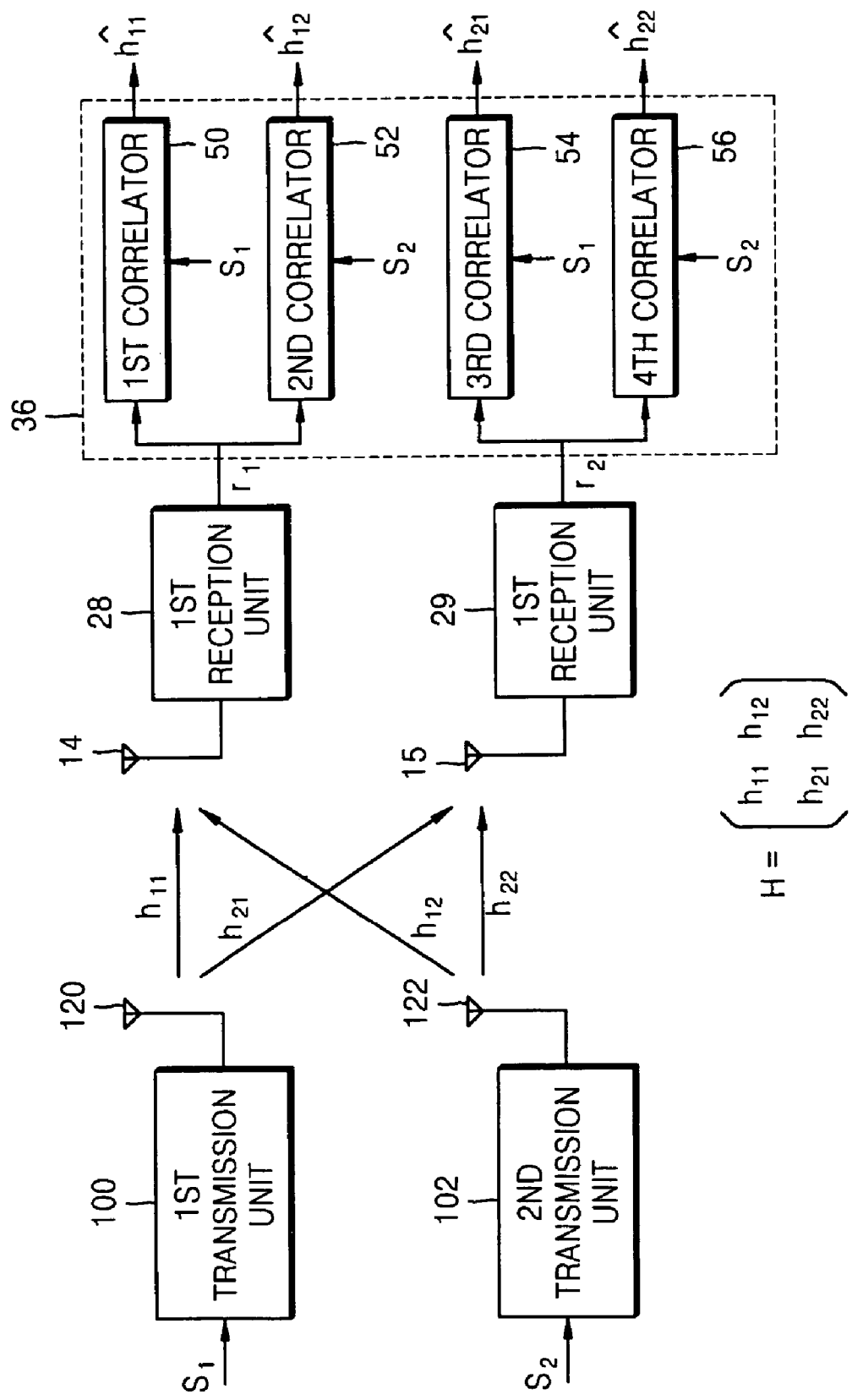
FIG. 4 is a block diagram illustrating a method of estimating a channel matrix in a multi-input multi-output (MIMO) method with 2 transmission antennas and 2 reception antennas according to the present invention.

FIG. 4 is a block diagram illustrating a method of estimating a channel matrix in an MIMO method with 2 transmission antennas and 2 reception antennas according to the present invention. Referring to FIG. 4, a channel matrix estimation unit 36 includes first through fourth correlators 50, 52, 54 and 56. A first transmission unit 100 of an MIMO transmitter transfers a carrier wave modulated by a training signal vector ($s_1$) to a first transmission antenna 120. Likewise, a carrier wave modulated by a transmission training signal vector ($s_2$) is transferred to a second transmission antenna 122. The first transmission antenna 120 and the second transmission antenna 122 transmit independent signals through multi paths in an identical frequency band. These parallel multi paths can be expressed in a channel matrix (H). That is, when reception training signals are expressed as $r_1$ and $r_2$, according to y=Hx, the multi paths can be expressed as Equations (1) and (2) below:

$$r_1 = s_1 h_{11} + s_2 h_{12} \quad (1)$$

$$r_2 = s_1 h_{21} + s_2 h_{22} \quad (2)$$

The two reception antennas, a first reception antenna 14 and a second reception antenna 15, are also disposed in a reception side. A modulated carrier wave incident on the first reception antenna 14 is output as a first reception training signal ($r_1$) by a first reception unit 28. Likewise, a modulated carrier wave incident on the second reception antenna 15 is output as a second reception training signal ($r_2$) by a second reception unit 29. The first reception training signal ($r_1$) is divided into 2 signals and input to the first correlator 50 and the second correlator 52.

s1 and s2 are quasi-orthogonal or orthogonal signals, such as M series or Walsh series signals, and satisfy Equation (3) below:

$$s1 * s1 = 1$$

$$s1 * s2 = 0$$

$$s2 * s2 = 1 \quad (3)$$

Here, * is a correlation calculation by a correlator.

The first through fourth correlators 50, 52, 54 and 56 perform correlation calculations of Equations (4) through (7) below:

$$\hat{h}_{11} = r_1 * s_1 = (s_1 * s_1) \cdot h_{11} + (s_1 * s_2) \cdot h_{12} = h_{11} \quad (4)$$

$$\hat{h}_{12} = r_1 * s_2 = (s_1 * s_2) \cdot h_{11} + (s_2 * s_2) \cdot h_{12} = h_{12} \quad (5)$$

$$\hat{h}_{21} = r_2 * s_1 = (s_1 * s_1) \cdot h_{12} + (s_1 * s_2) \cdot h_{22} = h_{21} \quad (6)$$

$$\hat{h}_{22} = r_2 * s_2 = (s_1 * s_2) \cdot h_{12} + (s_2 * s_2) \cdot h_{22} = h_{22} \quad (7)$$

As illustrated above, if Equation (3) is satisfied, estimated values $h_{11}$, $h_{12}$, $h_{21}$, and $h_{22}$ can be obtained from the first through fourth correlators 50, 52, 54 and 56, respectively, as illustrated in Equations (4) through (7). In this way, by using the transmission training signals and the reception training signals, the estimated value of the channel matrix (H) can be obtained.

Step 206 of FIG. 3 for calculating a channel capacity will now be explained in more detail.

The channel capacity calculation unit 37 determines a mean noise power and calculates a mean signal-to-noise ratio (SNR) of reception. Then, by using the mean reception SNR and the estimated value of the channel matrix (H) obtained in step 204, a channel capacity (C) is calculated. The channel capacity (C) is expressed as a maximum signal transmission rate (bps/Hz) around a frequency as Equation (8) below, and is also referred to as a Shannon capacity:

$$C = \log_2\left[\det\left(I + \frac{SNR}{N} HH^H\right)\right] \text{ (bps/Hz)} \quad (8)$$

Here, I is a unit matrix, SNR is a mean reception SNR, N is the number of reception antennas, H is a channel matrix, a superscript H is a transposed conjugate.

Figure 5:
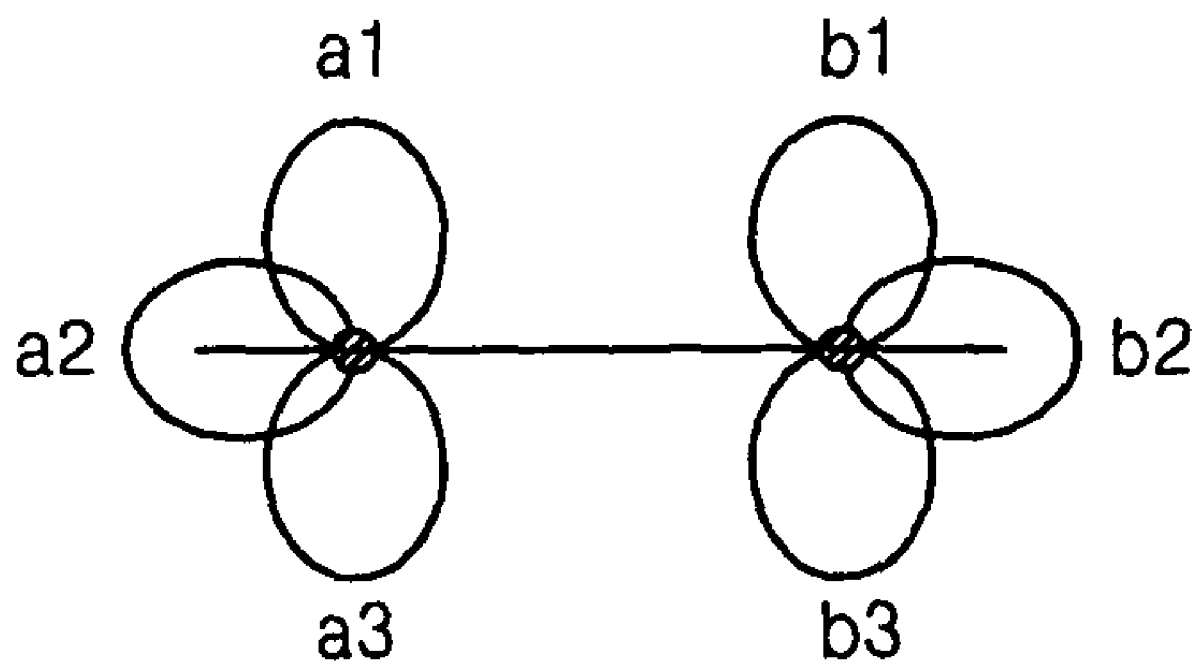
FIG. 5 is a diagram illustrating examples of antenna patterns that a first reception antenna and a second reception antenna can have according to the present invention.

FIG. 5 is a diagram illustrating examples of antenna patterns when antenna patterns that the first reception antenna 14 are a1, a2, and a3, and antenna patterns that the second reception antenna 15 are b1, b2, and b3. In this case, the number of combinations of the antenna patterns is 9 as illustrated in Table 1.

TABLE 1

| Combination of patterns | 1st reception antenna | 2nd reception antenna | Channel capacity |
|---|---|---|---|
| P11 | a1 | b1 | $C_{11}$ |
| P12 | a1 | b2 | $C_{12}$ |
| P13 | a1 | b3 | $C_{13}$ |
| P21 | a2 | b1 | $C_{21}$ |
| P22 | a2 | b2 | $C_{22}$ |
| P23 | a2 | b3 | $C_{23}$ |
| P31 | a3 | b1 | $C_{31}$ |
| P32 | a3 | b2 | $C_{32}$ |
| P33 | a3 | b3 | $C_{33}$ |

In addition, antenna patterns that the first reception antenna 14 and the second reception antenna 15 are not limited by common antenna patterns, and the number of antenna patterns is not limited either.

In step 208, the antenna patterns of each reception antennas 14 and 15 change to patterns that can maximize the channel capacity among combinations of antenna patterns. Until this maximum channel capacity is determined, transmission of training signals continues. Also, in relation to the transmission of the training signals, a continuation time may be defined in advance, or after the calculation of every channel matrix corresponding to every combination of patterns at the reception side is finished, the reception side may notify the transmission side (handshake) of the completion, thereby finishing the transmission. In relation to the change of the antenna patterns, a control signal from the antenna pattern control circuit 38 illustrated in FIG. 2 is transferred to the reactance control circuits 34 and 35, and the reactance control circuits 34 and 35 set the variable reactances 30 and 31 to appropriate values, thereby changing the antenna patterns.

After the above operations, communication begins and according to the estimated channel matrix (H), the original data stream can be obtained from the received vector signal.

The present invention will now be compared with the technology disclosed in Patent Document 1. In the technology of Patent Document 1, an evaluation function is a channel matrix (H), and three calculations, including estimation of a channel matrix (H), calculating back from the estimated channel matrix (H), and generation of antenna patterns, are required.

In the present invention, an SNR is also used as an evaluation function, and a channel capacity can be directly calculated. As a result, only two calculations, including estimation of H and a channel capacity, are required. Also, the reception antennas do not need to be adaptive array antennas, and only selection among a plurality of antenna patterns is needed, thereby making decision easier.

The simulation results in a 2×2 MIMO method will now be explained.

Figure 6A:
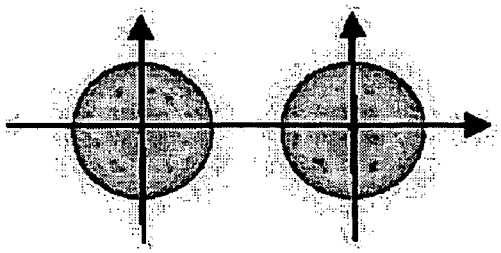
FIGS. 6A, 6B and 6C are diagrams illustrating exemplary combinations of antenna patterns used in simulation according to the present invention.
Figure 6B:
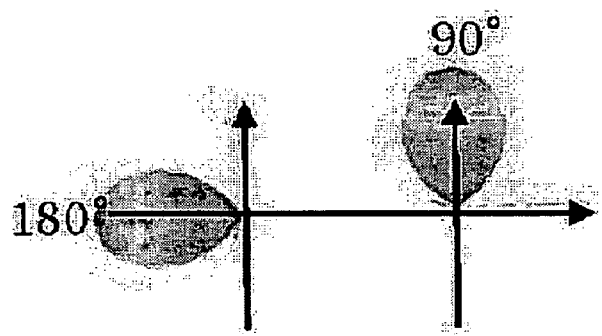
Figure 6C:
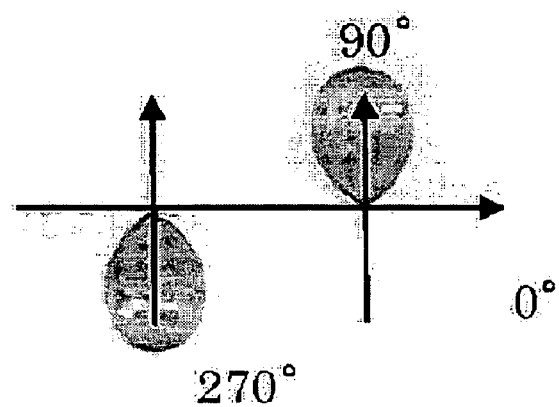

FIGS. 6A, 6B and 6C are diagrams illustrating exemplary combinations of antenna patterns used in the simulation according to the present invention. FIG. 6A is an omni pattern, FIG. 6B is a combination of patterns P21, and FIG. 6C is a combination of patterns P31. In this case, the results of the simulation of a channel capacity are expressed as Table 2 below:

TABLE 2

|  | Omni pattern | Combination of patterns P21 | Combination of patterns P31 |
|---|---|---|---|
| LOS | 11.09 | 12.55 | 11.54 |
| NLOS | 9.27 | 9.35 | 10.24 |

Here, the unit is bps/Hz.

In a line of sight (LOS) environment, the combination of patterns P21 has a larger channel capacity, and in a non line of sight (NLOS) environment, the combination of patterns P31 has a larger channel capacity. The larger the channel capacity is made to be, the better the communication quality expressed in a bit error rate (BER) becomes.

Also, an example of evaluation of a BER in a 16 quadrature amplitude modulation (QAM) digital modulation method by a minimum mean square (MMSE) in an MIMO method will now be explained.

Figure 7:
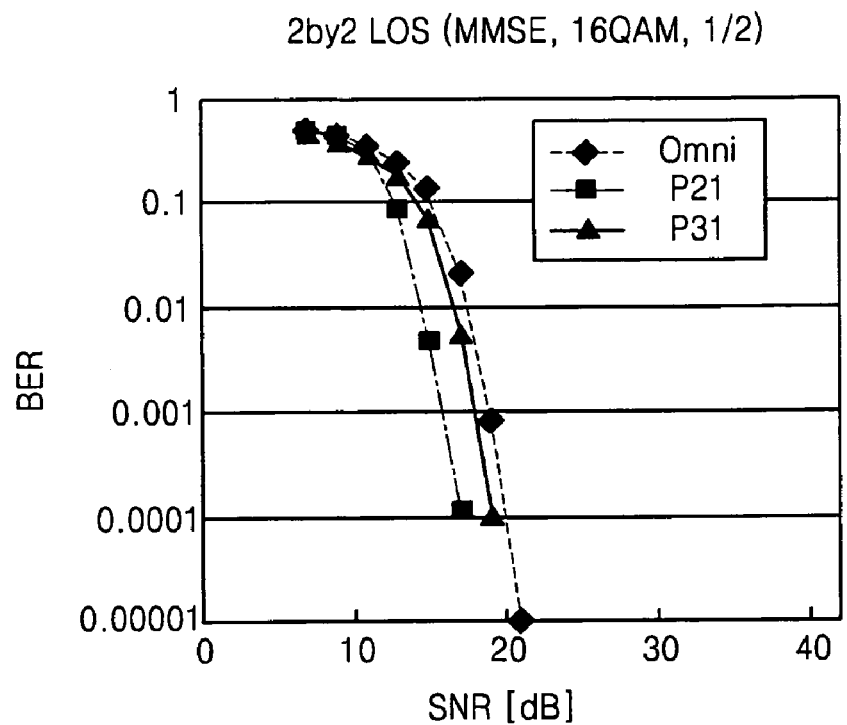
FIG. 7 is a graph illustrating signal-to-noise ratio (SNR) dependency of a bit error ratio (BER) in a line of sight (LOS) environment according to the present invention.

FIG. 7 is a graph comparing BERs of the omni pattern (dotted line), the combination of patterns P21 (dash-dot line), and the combination of patterns P31 (solid line) in an LOS environment.

Referring to FIG. 7, it can be seen that the BER can be improved more in order of the omni pattern, the combination of patterns P31, and the combination of patterns P21. For example, in the case of the combination of patterns P21, the BER is improved to about 0.0001 at 16 dB of the SNR.

Figure 8:
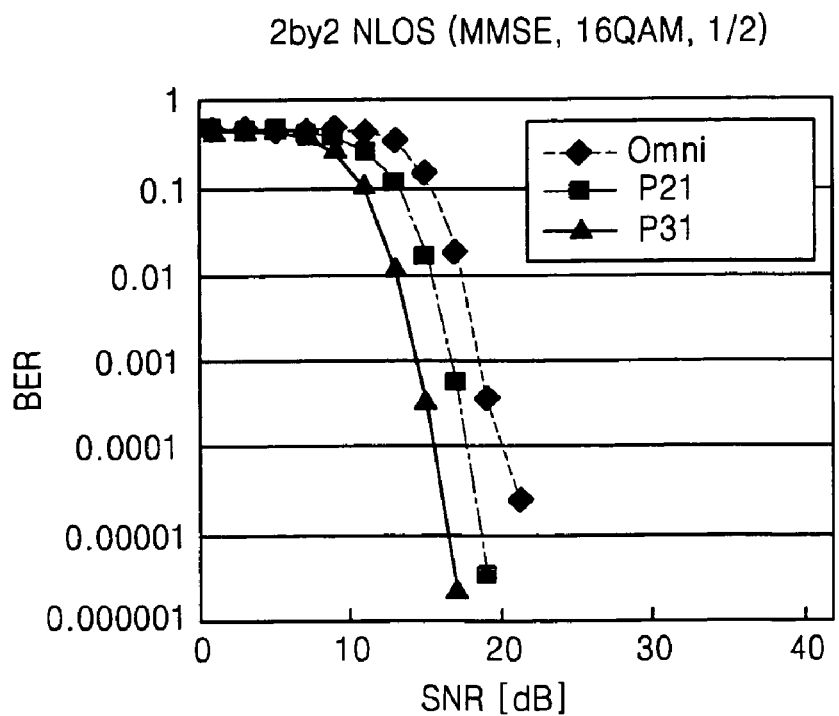
FIG. 8 is a graph illustrating SNR dependency of a BER in a non line of sight (NLOS) environment according to the present invention.

FIG. 8 is a graph comparing BERs of the omni pattern (dotted line), the combination of patterns P21 (dash-dot line), and the combination of patterns P31 (solid line) in an NLOS environment.

Referring to FIG. 8, it can be seen that the BER has been improved more in order of the omni pattern, the combination of patterns P21, and the combination of patterns P31. For example, in the case of the combination of patterns P31, the BER is improved to equal to or less than about 0.0001 at 16 dB of the SNR.

Thus, the channel capacity and the BER change according to the antenna patterns, and when the BER is worsened, as well as when the communication begins, selection of the antenna patterns is performed again, thereby controlling the antenna patterns so that the channel capacity can be increased. As a result, the communication quality, such as the BER, is improved.

According to the present invention, a channel matrix between a plurality of transmission antennas and a plurality of reception antennas which each have a plurality of antenna patterns, is estimated, and by using this channel matrix, a channel capacity corresponding to the combination of antenna patterns of the plurality of reception antennas is calculated. Then, the antenna patterns of the plurality of reception antennas are changed so that the channel capacity can be maximized, thereby reducing the amount of computation in the process of selecting antenna patterns. In this way, the MIMO radio communication apparatus and method in which direction can be controlled adaptively to a propagation environment can be provided.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A radio communication apparatus, comprising:
   a plurality of reception antennas each having a plurality of antenna patterns;
   a channel matrix estimation unit for estimating a channel matrix between a plurality of transmission antennas and the plurality of reception antennas;
   a channel capacity calculation unit for calculating a channel capacity corresponding to a combination of antenna patterns of the plurality of reception antennas by using the estimated channel matrix; and
   an antenna pattern control unit for changing the antenna patterns of the plurality of reception antennas to maximize the channel capacity.

2. The apparatus of claim 1, wherein the channel matrix estimation unit estimates the channel matrix by using transmission training signals transmitted by the plurality of transmission antennas, and reception training signals received by the plurality of reception antennas.

3. The apparatus of claim 2, wherein the respective transmission training signals are quasi-orthogonal or orthogonal signals.

4. The apparatus of claim 1, wherein the plurality of reception antennas include variable reactances, and by changing the variable reactances, the antenna pattern control unit changes the antenna patterns of the plurality of reception antennas.

5. The apparatus of claim 4, wherein the antenna pattern control unit comprises:
   an antenna pattern control circuit for outputting a control signal to change the antenna patterns of the plurality of reception antennas based on the channel capacity calculated in the channel capacity calculation unit to maximize the channel capacity; and
   a reactance control circuit for changing the variable reactances in response to the control signal output from the antenna pattern control circuit.

6. The apparatus of claim 2, wherein the channel matrix estimation unit estimates the channel matrix using the result of performing a correlation calculation between each of the transmission training signals and each of the reception training signals.

7. The apparatus of claim 6, wherein the plurality of transmission antennas include a first transmission antenna and a second transmission antenna for transmitting a first transmission training signal and a second transmission training signal, respectively, the second transmission training signal being orthogonal to the first training transmission signal, and
   the plurality of reception antennas include a first reception antenna and a second reception antenna for receiving a first reception training signal and a second reception training signal, respectively, and
   the channel matrix estimation unit comprises:
   a first correlator for performing a correlation calculation between the first reception training signal and the first transmission training signal;
   a second correlator for performing a correlation calculation between the first reception training signal and the second transmission training signal;
   a third correlator for performing a correlation calculation between the second reception training signal and the first transmission training signal; and
   a fourth correlator for performing a correlation calculation between the second reception training signal and the second transmission training signal, and
   the channel matrix estimation unit estimates the calculation results of the first through fourth correlators as each element of the channel matrix.

8. The apparatus of claim 1, wherein the channel capacity calculation unit calculates the channel capacity by using the estimated channel matrix and a reception signal-to-noise (SNR) ratio.

9. A radio communication apparatus, comprising:
   a plurality of transmission antennas;
   a plurality of reception antennas each having a plurality of antenna patterns;
   a channel matrix estimation unit for estimating a channel matrix between the plurality of transmission antennas and the plurality of reception antennas;
   a channel capacity calculation unit for calculating a channel capacity corresponding to a combination of antenna patterns of the plurality of reception antennas by using the estimated channel matrix; and
   an antenna pattern control unit for changing the antenna patterns of the plurality of reception antennas to maximize the channel capacity.

10. A radio communication method comprising:
    estimating a channel matrix between a plurality of transmission antennas and a plurality of reception antennas which each have a plurality of antenna patterns;
    calculating a channel capacity corresponding to a combination of antenna patterns of the plurality of reception antennas by using the estimated channel matrix; and
    changing the antenna patterns of the plurality of reception antennas to maximize the channel capacity.

11. The method of claim 10, wherein in the estimating of the channel matrix, the channel matrix is estimated by using transmission training signals transmitted by the plurality of transmission antennas, and reception training signals received by the plurality of reception antennas.

12. The method of claim 10, wherein the plurality of reception antennas include variable reactances, and in the changing of the antenna patterns, by changing the variable reactances, the antenna patterns of the plurality of reception antennas are changed.

13. The method of claim 11, wherein in the estimating of the channel matrix, the channel matrix is estimated by using the result of performing a correlation calculation between each of the transmission training signals and each of the reception training signals.

14. The method of claim 13, further comprising:
the plurality of transmission antennas transmitting in parallel a first transmission training signal and a second transmission training signal, the second transmission training signal being orthogonal to the first training transmission signal; and
the plurality of reception antennas receiving a first reception training signal and a second reception training signal,
wherein the estimating of the channel matrix comprises:
performing a correlation calculation between the first reception training signal and the first transmission training signal;
performing a correlation calculation between the first reception training signal and the second transmission training signal;
performing a correlation calculation between the second reception training signal and the first transmission training signal; and
performing a correlation calculation between the second reception training signal and the second transmission training signal, and
estimating the calculation results of the correlation calculations as each element of the channel matrix.

15. A radio communication method, comprising:
a plurality of transmission antennas transmitting in parallel transmission training signals;
a plurality of reception antennas which each have a plurality of antenna patterns, receiving in parallel reception training signals;
estimating a channel matrix between the plurality of transmission antennas and the plurality of reception antennas, by using the transmission training signals and the reception training signals;
calculating a channel capacity corresponding to a combination of antenna patterns of the plurality of reception antennas by using the estimated channel matrix; and
changing the antenna patterns of the plurality of reception antennas to maximize the channel capacity.

16. A non-transitory computer readable recording medium having embodied thereon a computer program for executing a radio communication method, wherein the method comprises:
estimating a channel matrix between a plurality of transmission antennas and a plurality of reception antennas which each have a plurality of antenna patterns;
calculating a channel capacity corresponding to a combination of antenna patterns of the plurality of reception antennas by using the estimated channel matrix; and
changing the antenna patterns of the plurality of reception antennas to maximize the channel capacity.

* * * * *